Dec. 19, 1967 J. R. BIARD 3,359,483

HIGH VOLTAGE REGULATOR

Filed Nov. 29, 1963

JAMES R. BIARD
INVENTOR.

BY John G. Graham

ATTORNEY 3,359,483
HIGH VOLTAGE REGULATOR
James R. Biard, Richardson, Tex., assignor to Texas Instruments Incorporated, Dallas, Tex., a corporation of Texas
Filed Nov. 29, 1963, Ser. No. 327,132
10 Claims. (Cl. 323—21)

ABSTRACT OF THE DISCLOSURE

Disclosed is a transistor voltage regulator circuit employing a D.C. amplifier for amplifying a detected error signal and electro-optical means for applying the amplified error signal to the transistor voltage regulator, whereby the D.C. amplifier is electrically isolated from the transistor regulator.

The present invention relates generally to a transistor high voltage regulator. More particularly, it relates to a high voltage regulator having means for regulating the high voltage input in response to a low voltage error signal derived from the regulator output, and in which the regulating means is electrically isolated from the low voltage error signal.

Transistor high voltage regulators generally consist of a series regulator transistor, a non-linear device used as an error detector to sense any change in voltage across the output of the regulator, and a D.C. amplifier for amplifying the error signal and for feeding it back to the series regulator transistor. The error signal is at a low voltage, and if a very high voltage is to be regulated, considerable cascading of transistor stages and/or voltage divider networks is required between the series regulator transistor and the D.C. amplifier to span the large difference in potential levels of operation. Consequently, high voltage regulators are often quite large because of the number of additional components required in the feedback circuit.

The present invention provides a transistor regulator for regulating large supply voltages in which the D.C. amplifier is electrically isolated from the series regulator transistor and the high voltage being regulated, although the high voltage is still regulated in response to the D.C. amplifier output. This is accomplished in the invention by means of a semiconductor photosensitive means connected to the series regulator transistor for driving the latter in response to optical radiation generated by a solid-state, semi-conductor light source driven by the D.C. amplifier. Therefore, a simple feedback system is provided by means of optical coupling between the high voltage input and the low voltage error signal. This obviates the necessity of additional components to span the large potential difference, and thus voltages of all levels can be regulated without additional components or circuit alterations being required. Moreover, because of the semiconductor components used and the simplified feedback system, the regulator of this invention can be made as a package of small dimensions for miniature circuit applications.

Figures 1, 2, 4:
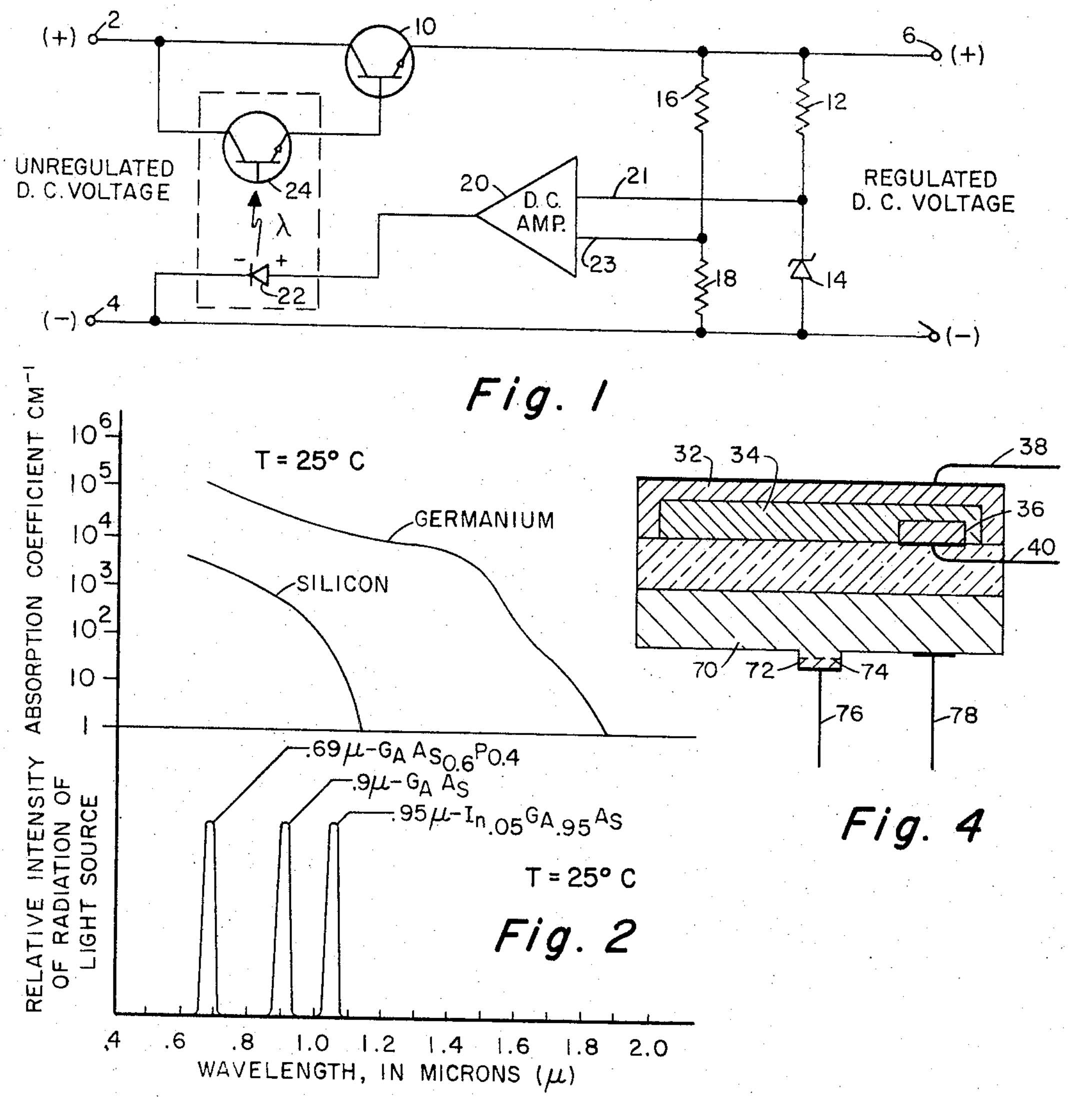
Figure 3:
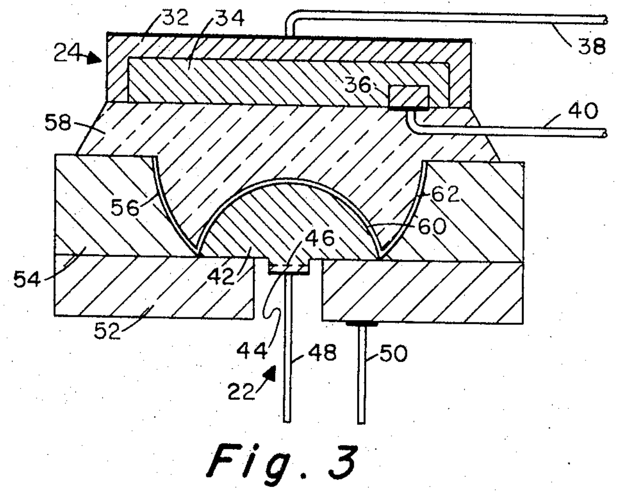

Other objects, features, and advantages of the present invention will become apparent from the following detailed description of the preferred embodiment thereof when taken in conjunction with the appended claims and attached drawing in which:

FIGURE 1 is an electrical schematic diagram of the invention using an electro-optical coupling device between the high and low voltage portions of the circuit;

FIGURE 2 is a graphical illustration showing the relative coefficient of absorption of optical radiation as a function of wavelength for the semiconductor materials silicon and germanium as compared to the relative intensity of optical radiation as a function of wavelength for three different light emitting diodes comprised of gallium-arsenide-phosphide ($GaAs_{0.6}P_{0.4}$), gallium-arsenide (GaAs), and indium-gallium-arsenide ($In_{.05}Ga_{.95}As$), respectively;

FIGURE 3 is an elevational view in section of one embodiment of the electro-optical coupling device shown within the dashed enclosure of FIGURE 1; and FIGURE 4 is an elevational view in section of another embodiment of the electro-optical coupling device shown in FIGURE 1.

Referring now to FIGURE 1, which is an electrical schematic diagram of the regulator circuit of this invention, a large unregulated D.C. voltage is applied across the input terminals 2 and 4, and the regulated voltage is developed across output terminals 6 and 8. A series regulator transistor 10 shown to be of the n-p-n variety, is connected in series with the unregulated D.C. voltage supply. The amount by which the transistor 10 conducts depends upon the amount of its base current. Connected across the output terminals is a resistor 12 connected in series with a constant voltage device 14, such as a Zener diode. A voltage divider, consisting of the serially connected resistors 16 and 18, is also connected across the output terminals. A D.C. amplifier 20, which is of any suitable design for amplifying a voltage differential, is connected via line 21 to the interconnection of diode 14 and resistor 12, and via line 23 to the interconnection of the voltage dividing resistors 16 and 18. Since the Zener diode sustains a constant voltage drop thereacross, the D.C. amplifier amplifies a voltage differential or error signal which is a function of the voltage at line 23 between the resistors 16 and 18. As will be seen presently, the ratio of resistor 18 to resistor 16 is selected to yield a voltage at line 23 nominally equal to the voltage drop across Zener diode 14 when the desired output voltage is present between terminals 6 and 8.

Connected as a load across the output of the D.C. amplifier is a semiconductor, junction diode 22 which generates light of a characteristic wavelength when a forward current is caused to flow through its junction, and in which the intensity of the light varies as a direct function of the magnitude of the forward current flowing through the junction. Thus, the magnitude of the current flowing through the junction of diode 22 in a forward direction is directly proportional to the differential voltage applied to the input of the D.C. amplifier via lines 21 and 23. Optically coupled to the light emitting diode 22 is a photosensitive transistor 24 whose conduction depends upon the intensity of light from diode 22. That is, the light causes the transistor 24 to become forward-biased and conduct to produce a collector current proportional to the base bias. To produce a linear response to the error signal detected and amplified by the D.C. amplifier, the transistor 24 is operated in its linear conduction region. Transistor 24 has its collector connected to the collector of series regulator transistor 10 and its emitter connected to the base of the series regulator transistor. Thus, an amount of current proportional to the base drive on transistor 24 is injected into the base of transistor 10. As transistor 10 conducts more heavily, the output voltage across terminals 6 and 8 increases, and vice-versa.

As noted earlier, the voltage on line 23 is nominally equal to the constant voltage sustained across Zener diode 14. Therefore, as the output voltage across terminals 6 and 8 increases above its nominal value, for example, the voltage differential between lines 21 and 23 to the input of the D.C. amplifier decreases, which results in a decrease in the forward current through light emitting diode 22. Thus, the conduction of both of transistors 24 and 10 decreases, which reduces the voltage across the output terminals 6 and 8. The reverse action occurs for a decrease of output voltage. The D.C. amplifier supplies a quiescent forward current to the diode 22, in which variations in the regulator output voltage cause change in the forward current. It should be noted that the current injected into the base of the series regulator transistor is linearly related to the output current of the D.C. amplifier.

From the above discussion it can be seen that complete electrical isolation is achieved between the high voltage input portion of the regulator to which the regulator transistor is electrically connected, and the low voltage portion of the regulator at which the error signal is generated. Actually, the voltage on the input lines 21 and 23 to the D.C. amplifier is normally quite small as compared to the onutput voltage if the circuit is designed to regulate high voltages. It is apparent that conventional systems required cascading of transistor stages and/or voltage divider networks to span the gap between the high voltage and low voltage portions of the circuit in order to provide the regulating operation. Thus, a conventional system is limited to the particular voltage for which it is designed to regulate, since regulation of higher voltages requires the addition of more cascaded stages, etc. However, the circuit of the present invention as shown and described in FIGURE 1 has the advantage that the circuit remains the same independent of the power supply voltage to be regulated. Moreover, it is apparent that the circuit is quite advantageous for regulating high voltage, say in excess of 1000 volts, for example, since no cascading or voltage divider networks are required between the output of the D.C. amplifier and the series regulator transistor. This is made possible, as noted above, because of the electrical isolation between these parts of the regulator circuit, which isolation is provided by the electro-optical coupling device shown within the dashed enclosure of FIGURE 1.

The electro-optical coupling device shown within the dashed enclosure of FIGURE 1 is a linear operation application of the device described in the copending application of Biard et al., entitled, Electro-Optical Coupling Device, Ser. No. 327,136, filed concurrently herewith, and assigned to the common assignee. As will be described hereinafter, light generating diode 22 is an efficient light source, wherein the intensity of light generated thereby can be modulated or varied in direct proportion to the forward current through the junction of the diode. The transistor 24, because of its semiconductor properties, is also photosensitive in that light of a suitable wavelength, when absorbed by the transistor bulk, will create hole-electron pairs. These charge carriers, when collected at one or both of the junctions, cause the transistor to conduct. The semiconductor junction diode 22, as noted earlier, generates optical radiation or light of a characteristic wavelength when a forward current is caused to flow across its junction, and the particular wavelength of light is such as to cause the transistor 24 to conduct. For purposes of the present invention, the terms light and optical radiation are used interchangeably and are defined to include electromagnetic radiation in the wavelength region from the near infrared into the visible sepctrum. The diode 22 is forward biased when the anode is positive with respect to its cathode, as indicated by the polarity notations thereon. The base of the transistor 24 is left "floating," since the optical radiation is used as the biasing means rather than through an electrical connection. During operation, optical radiation of sufficient intensity to cause the transistor to conduct at a quiescent point located near the middle of its linear conduction region is generated by the diode 22, such that increases and decreases in the regulator output voltage will be accompanied by an increase or decrease in the conduction of transistor 24 within its linear operating region.

A light emitting junction diode comprised of GaAs is described in the copending application of Biard et al., entitled, Semiconductor Device, Ser. No. 215,642, filed Aug. 8, 1962, assigned to the same assignee, and is an example of a suitable solid-state light source such as diode 22 of FIGURE 1. As will be described hereinafter in more detail, the diode can be comprised of other semiconductor materials to produce optical radiation of different wavelengths. As described in the above co-pending application, the diode comprises a body of semiconductor material, which contains a p-n rectifying junction. A forward current bias, when caused to flow through the junction, causes the migration of holes and electrons across the junction, and recombination of electron-hole pairs results in the generation of optical radiation having a characteristic wavelength or photon energy approximately equal to the band gap energy of the particular material from which the diode is fabricated. It will be noted from the above co-pending application that the generation of optical radiation in the diode is caused by a forward current bias at the junction and is an efficient solid-state light source as contrasted to light generated by other mechanisms, such as reverse biasing the junction, avalanche processes, and so forth. The relative intensity of radiation as a function of wavelength for optical radiation generated by a gallium-arsenide p-n junction diode is shown in the lower graph of FIGURE 2, where it can be seen that the radiation intensity is greatest at a wavelength of .9 micron. Typical curves of the relative coefficient of absorption of light as a function of wavelength for silicon and germanium are shown in the upper graph of FIGURE 2, where it can be seen that the .9 micron wavelength radiation generated by a gallium-arsenide diode will be absorbed by a body comprised either of silicon or germanium. Similar curves are shown for light generated by diodes comprised of gallium-arsenide-phosphide, $Ga(As_{0.6}P_{0.4})$, and indium-gallium-arsenide $(In_{0.5}Ga_{.95}As)$, where it can be seen again that either a germanium or silicon body will absorb the light of wavelengths of .69 micron and 0.95 micron, respectively.

These compositions are enumerated as examples only, and other useful compositions will be described below. It will also be noted from the graphs of absorption coefficients that before any appreciable absorption occurs in silicon or germanium, the photon energy must be at least slightly greater than the band gap energies of silicion and germanium, respectively. The band gap energies for silicon and germanium are 1.04 ev. and .63 ev., respectively. The graphs of FIGURE 2 show that absorption begins in silicon at a wavelength of about 1.15 micron, which corresponds to a photon energy of about 1.07 ev., and increases with shorter wavelengths; and absorption begins in germanium at about 1.96 micron, which corresponds to a photon energy of about .64 ev., and increases with shorter wavelengths. These two energies are greater than the respective band gap energies of the two materials, which clearly indicates the band-to-band transitions of electrons upon absorption, which is the type absorption with which the invention is concerned.

Since the optical radiation generated by the diode must be absorbed by the photosensitive transistor 24 in such a manner as to cause it to conduct, it is important to consider in more detail the absorption phenomenon which will more clearly illustrate the invention and its advantages. It can be seen from FIGURE 2 that the coefficient of absorption of light is less for longer wavelengths and, thereof, penetrates to a greater depth in a body of semiconductor material before being absorbed than does light of shorter wavelengths. When the light is absorbed in the transistor and generates charge carriers, the carriers, which are holes and electrons, must diffuse to one of the junction regions therewithin in order to produce a bias to cause it to conduct. In other words, the invention is not concerned with the photoconductive effect within the material of the detector, but a junction effect, wherein the characteristics of the junction are altered when current carriers created by absorption of photons are collected at the junction. Thus the light must be absorbed in the transistor within the diffusion length of the carriers produced thereby from one or both of the junctions. For longer wavelength light, the junction at which the carriers are collected must be at a relatively large depth below the surface of the transistor body in order that the majority of the carriers produced by the light be collected. In other words, more depth of material is required before all of the light impinging on the surface of the transistor body is absorbed, although a percentage of the light will be absorbed in each successive unit thickness of the transistor body. Thus, the region over which the light is absorbed is relatively wide, and in order to insure the efficient collection at the junction of the majority of charge carriers generated thereby, relatively high lifetime material is used in the transistor bulk when long wavelength light is used. However, high lifetime material increases the diffusion time of the charge carriers from their point of origination to the junction, therefore decreasing the speed at which the transistor is turned on by the light. Conversely, by using optical radiation of shorter wavelength, the junction depth and lifetime of the semiconductor material can be correspondingly decreased without decreasing the collection efficiency, such as by the use of a light emitting diode comprised of $GaAs_{0.6}P_{0.4}$, for example.

A side elevational view in section of one embodiment of the electro-optical coupling device is shown in FIGURE 3, which comprises the transistor 24 and the semiconductor junction diode 22 optically coupled thereto. The transistor is comprised of semiconductor material such as germanium or silicon, and is of either the n-p-n or p-n-p variety. The transistors 24 and 10 have been shown in FIGURE 1 to be of the n-p-n variety, although a p-n-p variety could be used with a reversal of polarities in the circuit. There is also shown in FIGURE 3 a suitable structure for mounting the components of the electro-optical switch to provide the necessary optical coupling between the switch and the driving source. The light emitting junction diode comprises a hemispherical semiconductor region 42 of a first conductivity type and a smaller region 44 of an opposite conductivity type contiguous therewith. An electrical connection 48 is made to the region 44 and constitutes the anode of the junction diode, and the flat side of the region 42 is mounted in electrical connection with a metallic plate 52 with the region 44 and lead 48 extending into and through a hole in the plate. An electrical lead 50 is provided to the metallic plate 52 and constitutes the cathode of the diode. The diode is fabricated by any suitable process, such as, for example, by the diffusion process described in the above co-pending application or by any epitaxial process, to be described hereinafter, and contains a p-n rectifying junction 46 at or near the boundary between the regions 42 and 44.

The photosensitive transistor 24 comprises a semiconductor wafer 32 of a first conductivity type used as the collector into which an impurity of the opposite conductivity determining type is diffused to form a circular base region 34. An impurity of the same conductivity determining type as the original wafer 32 is diffused into the base region 34 to form an emitter region 36 of relatively small area. The transistor shown is of planar construction and is designed to have a relatively high forward current gain, $h_{FE}$, with which those skilled in the art are familiar. An electrical connection is made to the collector region 32 by means of wire 38, and another electrical connection is made to the emitter region 36 by means of wire 40. The base region 34 is left "floating" without an external electrical connection thereto, since the driving source for causing the transistor to conduct is effected by means of the optical radiation from the junction diode.

Another plate 54 is mounted about the diode and defines a hempispherical reflector surface 56 about the hemispherical dome 42. The photosensitive transistor 24 is mounted above the hemispherical dome with the emitter 36 and base 34 facing the dome. A light transmitting medium 58 is used to fill the region between the reflector and the dome and for mounting the transistor above the dome, wherein the light transmitting medium acts as a cement to hold the components together. Ample space is provided between the top of the reflector plate 54 and the transistor for passing the lead 40 from the emitter region 36 out of the region of the dome without being shorted to either the transistor or the reflector plate. The lead is held in place by the cement-like transmitting medium. When a forward bias current is passed through the junction of the radiant diode between the anode 48 and the cathode 50, light is emitted at the junction, travels through the dome 42 and the light transmitting medium 58 and strikes the surface of the transistor, where it is principally absorbed in the region of the collector-base junction to cause the transistor to conduct.

The hemispherical dome structure is preferably used in order to realize the highest possible quantum efficiency. If the proper ratio of the radius of the junction 46 to the radius of the hemispherical dome is selected, then all of the internally generated light that reaches the surface of the dome has an angle of incidence less than the critical angle and can be transmitted. The maximum radius of the diode junction with respect to the dome radius depends on the refractive index of the coupling medium, and since all of the light strikes the dome surface close to the normal, a quarter wavelength anti-reflection coating will almost completely eliminate reflection at the dome surface. The maximum radius of the light emitting diode junction to the dome radius is determined by computing the ratio of the index of refraction of the coupling medium to the index of refraction of the dome material. The dome, as shown in FIGURE 3, has a quarter wavelength anti-reflection coating 60 thereon comprised of zinc-sulfide to eliminate any possible reflection. A true hemispherical dome is optimum, because it gives the least bulk absorption to all spherical segments which radiate into a solid angle of $2\pi$ steradians or less. Spherical segments with height greater than their radius radiate into a solid angle less than $2\pi$ steradians, but have higher bulk absorption. Spherical segments with height less than either radius have less absorption but emit into a solid angle greater than $2\pi$ steradians and, therefore, direct a portion of the radiation away from the detector. Due to the presence of bulk absorption, the dome radius should be as small as possible to further increase the quantum efficiency of the unit.

The photosensitive transistor has a radius of about 1.5 times the radius of the hemispherical dome, which allows all the light emitted by the dome to be directed toward the detector by the use of a simple spherical reflecting surface 56. Since most of the light from the hemispherical dome strikes the transistor surface at high angles of incidence, an anti-reflection coating on the detector is not essential and can be considered optional. The light transmitting medium 58 between the dome and the transistor should have an index of refraction high enough with respect to the indices of refraction of the dome and the transistor to reduce internal reflections, and to allow the ratio of the junction radius of the diode to the dome radius to be increased. The medium should also "wet" the surfaces of the source and the detector so that there are no voids which would destroy the effectiveness of the coupling medium. The indices of refraction of the diode and the silicon transistor are each about 3.6. A resin such as Sylgard, which is a trade name of the Dow Corning Corporation of Midland, Mich., has an index of refraction of about 1.45 and is suitable for use as the light transmitting medium. Although this index is considerably lower than 3.6, it is difficult to find a "transparent" substance that serves this purpose with a higher index. In order to insure the highest reflectivity, the reflector surface 56 is provided with a gold mirror 62 which can be deposited by plating, evaporation, or any other suitable process.

The metallic plates 52 and 54 are preferably comprised of a metal or alloy having the same or similar coefficient of thermal expansion as the junction diode, such as Kovar, for example. Similarly, the coupling medium 58 preferably has the same or similar coefficient of thermal expansion, or alternately remains pliable over a wide, useful temperature range of normal operation. Again, Sylgard satisfies this requirement by being pliable.

Various compositions of the light emitting diode and photosensitive transistor have been mentioned in conjunction with the graphs of FIGURE 2, wherein the preferred compositions depend upon several factors including the absorption coefficient of the photosensitive transistor, the ultimate efficiency to be achieved from the light emitting diode, and other factors as will be presently described. One factor to be considered is the speed of response of the photosensitive transistor to the optical radiation, wherein it has been seen that light of shorter wavelength gives a faster switching time because of the greater coefficient of absorption of the detector. This factor, if considered by itself, would indicate that a diode comprised of a material which generates the shortest possible wavelength is preferred. However, the efficiency of the light source must also be considered, in which the over-all efficiency can be defined as the ratio of the number of photons of light emerging from the dome to the number of electrons of current to the input of the diode, and the internal efficiency is the ratio of the number of photons of light generated in the diode to the number of input electrons.

It was pointed out in the above co-pending application that, in most cases, less of the light generated internally in the diode is absorbed per unit distance in the n-type region rather than in the p-type region. Moreover, n-type material can normally be made of higher conductivity than p-type material of the same impurity concentration. Thus, the dome is preferably of n-type conductivity material. In addition to this factor, it has been found that the greater the band gap of the material in which the light is generated, the shorter the wavelength of the light, wherein the frequency of the generated light is about equal to or slightly less than the frequency separation of the band gap. It has further been found that the light is absorbed to some extent in the material in which it is generated or in a material of equal or less band gap width, but is readily transmitted through a material having a band gap width at least slightly greater than the material in which the light is generated. In fact, a sharp distinction is observed between the efficient transmission of light through a composition whose band gap is slightly greater than the composition in which the light is generated, and through a composition having a band gap equal to or less than that of the generating composition. This implies that the light is readily transmitted through a material the frequency separation of the band gap of which is greater than the frequency of the generated light.

To take advantage of this knowledge, the light emitting diode, in the preferred embodiment, is comprised of two different compositions in which the junction at or near which the light is generated is located in a first region of the diode comprised of a material having a first band gap width and of p-type conductivity, and in which at least the major portion of the dome is comprised of a second material having a second band gap width greater than the first material and is of n-type conductivity. Thus, light generated in the first material has a wavelength which is long enough to be efficiently transmitted through the dome. There are several materials that have been found to be internally efficient light generators when a forward current is passed through a junction located therein, in addition to GaAs noted in the above co-pending application.

The material indium-arsenide, InAs, has a band gap width of about .33 ev. and, if a p-n junction is formed therein, will generate light having a wavelength of about 3.8 microns, whereas light from GaAs is about .9 micron. The compositions $In_xGa_{1-x}As$, where $x$ can go from 0 to 1, give off light of wavelength which varies approximately linearly with $x$ between 3.8 microns for InAs when $x=1$ to .9 micron for GaAs when $x=0$. On the other side of GaAs is the composition gallium-phosphide, GaP, which has a band bap of about 2.25 ev. and emits radiation of about .5 micron. Also, the compositions $GaAs_xP_{1-x}$, where $x$ can go from 0 to 1, give off light of wavelength which varies approximately linearly with $x$ between .9 micron for GaAs when $x=1$ to .5 micron for GaP when $x=0$. It has been found, however, that for various reasons, the internal efficiency of light generation begins to drop off when the band gap of the material used is as high as about 1.8 ev., which approximately corresponds to the composition $GaAs_{0.6}P_{0.4}$, or for $x$ equal to or less than about 0.6 for the compositions $GaAs_xP_{1-x}$.

Referring again to the FIGURE 3 and more specifically to the construction of the light emitting diode, a preferred embodiment comprises a dome 42 of n-type conductivity material with a smaller region 44 contiguous therewith in which a portion is of p-type conductivity. The region 44 is comprised of a composition having a first band gap width, and the dome 42 is comprised of a region having a second band gap width greater than that of region 44. The rectifying junction 46 is formed in the region 44 of smaller band gap width so that the light generated therein will be efficiently transmitted through the dome. The portion of region 44 between the junction 46 and the dome is of n-type conductivity. Referring to the graphs of FIGURE 2 and the foregoing discussion, a preferred composition for the region 44 is one which will generate as short a wavelength as possible in order to have a high coefficient of absorption in the transistor for fast switching action, and yet which will be efficiently transmitted by the dome 42. At the same time, the composition of region 44 should have a high internal efficiency as a light generator. The composition $GaAs_{0.6}P_{0.4}$ will efficiently produce light of wavelength of about .69 micron and constitutes the preferred material for the smaller region 44. By making the dome of a composition of band gap slightly greater than that of the region 44, such as $GaAs_{0.5}P_{0.5}$, for example, or for $x$ equal to or less than 0.5 for the compositions $GaAs_xP_{1-x}$, the light will be efficiently transmitted. It should be noted that although the dome is comprised of a composition that does not have a high internal efficiency of light-generation, this is unimportant since the light is actually generated in the smaller region 44 of high efficiency. Thus, the dome material can be extended to compositions of relatively high band gap widths, even to GaP, without decreasing the over-all efficiency of the unit.

Other compositions and combinations thereof can be used, such as various combinations of $In_xGa_{1-x}As$ or $GaAs_xP_{1-x}$, or both. In addition, most III–V compounds can be used, or any other material which generates light by a direct recombination process when a forward current is passed through a rectifying junction therein. Moreover, the entire light emitting diode can be comprised of a single composition such as, for example GaAs as described in the above co-pending application. It can, therefore, be seen how the compositions of the various components of the system can be varied to achieve various objectives, including the highest over-all efficiency of the entire system. Undoubtedly, other suitable compositions and combinations thereof will occur to those skilled in the art.

The light emitting diode can be made by any suitable process. For example, if two different compositions are used, a body or wafer constituted of a single crystal of one of the compositions can be used as a substrate onto which a single crystal layer of the other composition is deposited by an epitaxial method, which method is well known. Simultaneous with or subsequent to the epitaxial deposition, the rectifying junction can be formed in the proper composition, slightly removed from the boundary between the two, by the diffusion of an impurity that determines the opposite conductivity type of the composition. By etching away most of the composition containing the junction, the small region 44 can be formed. If the entire light emitting diode is comprised of a single composition, a simple diffusion process can be used to form the junction. The shape of the dome is formed by any suitable method, such as, for example, by grinding or polishing the region 42.

Another embodiment of the coupling device is shown in FIGURE 4, which is an elevational view in section of a planar constructed light emitting diode optically coupled to a planar transistor as shown in FIGURE 3. The light emitting diode comprises a wafer 70 of semiconductor material of a first conductivity type into which is diffused an impurity that determines the opposite conductivity type to form a region 72 of said opposite conductivity type separated from the wafer 70 by a rectifying junction 74. The wafer is etched to cut below the junction and form the small region 72. Alternatively, the region 72 can be formed by an epitaxial process. Electrical leads 76 and 78 are connected to the region 72 and wafer 70 as previously described.

The wafer 70 is not formed into a dome structure in this embodiment, but is left in a planar configuration and optically coupled to the detector, as shown, with a suitable coupling medium 58 as noted earlier. This embodiment is more expedient to fabricate, as can be readily seen, and thus is advantageous in this respect. As indicated above, the dome structure is used to realize a high quantum efficiency, since all of the internally generated light strikes the surface of the dome at less than the critical angle, and thus little, if any, light is lost to internal reflections within the dome. This is not necessarily the case in the planar embodiment of FIGURE 4, and in order to achieve a high quantum efficiency, the diameter of the apparent light emitting surface of wafer 70, assuming a circular geometry, can be made somewhat smaller than the combined diameters or lateral dimensions across the two emitters of the detector. The apparent light emitting surface of the diode is determined by the thickness of wafer 70, the area of the light emitting junction 74, and the critical angle for total internal reflection. The critical angle of reflection is determined by computing the arcsine of the ratio of the index of refraction of the coupling medium 58 to the index of refraction of the semiconductor wafer 70.

In the preceding discussions, it was noted that a coupling medium having a suitable index of refraction is preferably used between the light emitting diode and the detector. If such a medium is used, it should have a high index to match, as closely as possible, that of the two components between which it is situated. Materials other than Sylgard can also be used, such as a high index of refraction glass. However, it can prove expedient and desirable in certain cases to couple the two components together with air, where a physical coupling is either impractical or impossible, and such a system is deemed to be within the intention of the present invention.

Although the preferred embodiment of the light emitting diode contains the junction in the region 44 below the boundary between the two regions 42 and 44, the junction can also be formed at this boundary or actually within the dome region 42 should this be more expedient for one or more reasons. In the case where the entire diode is comprised of a single composition, for example, an equally efficient light emitter can be made by locating the junction other than as shown in the preferred embodiment.

Other modifications, substitutions and alternatives will undoubtedly occur that are deemed to fall within the scope of the present invention, which is intended to be limited only as defined in the appended claims.

What is claimed is:

1. A voltage regulator circuit, comprising:
(a) a pair of input terminals across which an input voltage to be regulated is to be applied,
(b) a pair of output terminals across which the regulated output voltage is developed,
($b_1$) a reference source connected across said output terminals,
(c) regulator means connected between one of said input terminals and one of said output terminals for regulating said input voltage in response to a control signal,
(d) detector means connected across said output terminals and to said reference source for sensing a variation in the magnitude of said regulated output voltage when compared with said reference source and producing an electrical error signal proportional to said variation,
(e) photosensitive means coupled to said regulator means for generating said control signal in response to optical radiation incident thereon, and
(f) a light emitting device operatively connected to said detector means and optically coupled to said photosensitive means for generating said optical radiation which is directed on said photosensitive means in response to said error signal.

2. A voltage regulator circuit according to claim 1 wherein said regulator means is a first transistor.

3. A voltage regulator circuit according to claim 1 wherein said photosensitive means is a semiconductor device having at least one rectifying junction for generating a photocurrent in response to said optical radiation.

4. A voltage regulator circuit according to claim 2 wherein said photosensitive means is a second transistor interconnected with said first transistor.

5. A voltage regulator circuit according to claim 1 wherein said photosensitive means is a first semiconductor device comprised of a first semiconductor material having at least one rectifying junction therein, said first semiconductor device being characterized by the absorption of optical radiation incident thereon which has a photon energy greater than the band gap energy of said first semiconductor material for generating excess minority carriers therein and being responsive to said excess minority carriers to alter the characteristics of said at least one rectifying junction when said optical radiation is absorbed within a minority carrier diffusion length from said at least one rectifying junction, and said light emitting device is a second semiconductor device having a first region of one conductivity type and a second region of an opposite conductivity type contiguous to and forming a rectifying junction with said first region, said detector means producing an error signal which is a forward current through the rectifying junction of said second device with said second device generating optical radiation in response to said forward current which is characterized by a photon energy greater than the band gap energy of said first semiconductor material in which at least a portion thereof is absorbed in said first device within a minority carrier diffusion length from said at least one rectifying junction.

6. A voltage regulator circuit, comprising:
(a) a pair of input terminals across which an input voltage to be regulated is to be applied,
(b) a pair of output terminals across which the regulated output voltage is developed,
($b_1$) a reference source connected across said output terminals,
(c) photosensitive regulator means connected between one of said input terminals and one of said output terminals for regulating said input voltage in response to optical radiation incident thereon, (d) detector means connected across said output terminals and to said reference source for sensing a variation in the magnitude of said regulated output voltage when compared with said reference source and producing an electrical error signal proportional to said variation, and (e) a light emitting device operatively connected to said detector means and optically coupled to said photosensitive means for generating said optical radiation which is directed on said photosensitive means in response to said error signal.

7. A voltage regulator circuit, comprising:

(a) a pair of input terminals across which an input voltage to be regulated is to be applied, (b) a pair of output terminals across which the regulated output voltage is developed, ($b_1$) a reference source connected across said output terminals, (c) a first transistor connected in series with one of said input terminals of one polarity and one of said output terminals of the same polarity for regulating said input voltage in response to a control signal applied to a control electrode thereof, (d) detector means connected across said output terminals and to said reference source for sensing a variation in the magnitude of said regulated output voltage when compared with said reference source and producing an electrical error signal proportional to said variation, (e) a second photosensitive transistor coupled to said first transistor for generating said control signal at said control electrode in response to optical radiation incident thereon, and (f) a light emitting device operatively connected to said detector means and optically coupled to said second transistor for generating said optical radiation which is directed on said second transistor in response to said error signal.

8. A voltage regulator circuit according to claim 7 wherein said second transistor is comprised of a first semiconductor material and is characterized by the absorption of optical radiation incident thereon which has a photon energy greater than the band gap energy of said first semiconductor material for generating excess minority carriers therein and being responsive to said excess minority carriers to alter the characteristics of the emitter-base and base-collector junctions when said optical radiation is absorbed within a minority carrier diffusion length from at least one of said emitter-base and said base-collector junctions, and said light emitting device is a semiconductor device having a first region of one conductivity type and a second region of an opposite conductivity type contiguous to and forming a rectifying junction with said first region, said director means producing an error signal which is a forward current through the rectifying junction of said semiconductor light emitting device with said light emitting device generating optical radiation in response to said forward current which is characterized by a photon energy greater than the band gap energy of said first semiconductor material in which at least a portion thereof is absorbed in said second transistor within a minority carrier diffusion length from at least one of said emitter-base and base-collector junctions.

9. A voltage regulator circuit according to claim 5 wherein said second semiconductor device is comprised of a second semiconductor material having a band gap energy greater than that of said first semiconductor material.

10. A voltage regulator circuit according to claim 8 wherein said light emitting device is comprised of a second semiconductor material which has a band gap energy greater than that of said first semiconductor material.

References Cited

UNITED STATES PATENTS

| | | | |
|---|---|---|---|
| 2,779,897 | 1/1957 | Ellis | 323—21 X |
| 2,812,445 | 11/1957 | Anderson | 307—88.5 |
| 3,068,408 | 12/1962 | Lovegrove | 323—21 X |
| 3,229,158 | 1/1966 | Jensen | 323—21 X |
| 3,248,642 | 4/1966 | Rothschild | 323—21 |

JOHN F. COUCH, *Primary Examiner.*

W. E. RAY, *Assistant Examiner.*